United States Patent
Ramezan et al.

(10) Patent No.: US 11,902,110 B2
(45) Date of Patent: Feb. 13, 2024

(54) RESOURCE ALLOCATION IN DATA CENTER NETWORKS

(71) Applicants: Gholamreza Ramezan, Vancouver (CA); Amr Adel Nasr Abdelnasser, Vancouver (CA)

(72) Inventors: Gholamreza Ramezan, Vancouver (CA); Amr Adel Nasr Abdelnasser, Vancouver (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/975,447

(22) Filed: Oct. 27, 2022

(65) Prior Publication Data

US 2023/0133920 A1 May 4, 2023

Related U.S. Application Data (60) Provisional application No. 63/274,005, filed on Oct. 31, 2021.

(51) Int. Cl.
*H04L 41/5009* (2022.01)
*H04L 41/5025* (2022.01)
*H04L 41/50* (2022.01)

(52) U.S. Cl.
CPC ...... *H04L 41/5016* (2013.01); *H04L 41/5025* (2013.01); *H04L 41/5096* (2013.01)

(58) Field of Classification Search
None
See application file for complete search history.

(56) References Cited

U.S. PATENT DOCUMENTS

| | | | |
|---|---|---|---|
| 7,403,988 B1 * | 7/2008 | Blouin | H04L 45/123 370/252 |
| 10,409,642 B1 * | 9/2019 | Tang | G06F 9/5005 |
| 11,050,637 B2 * | 6/2021 | Mahindru | H04L 41/0895 |

(Continued)

FOREIGN PATENT DOCUMENTS

| | | |
|---|---|---|
| CN | 108183823 A | 6/2018 |
| CN | 110753009 A | 2/2020 |

(Continued)

OTHER PUBLICATIONS

S. A. Jyothi, S. H. Hashemi, R. Campbell, and B. Godfrey, "Towards an application objective-aware network interface," in 12th USENIX Workshop on Hot Topics in Cloud Computing (HotCloud 20). USENIX Association, Jul. 2020. [Online]. Available: https://www.usenix.org/conference/hotcloud20/presentation/jyothi.

(Continued)

*Primary Examiner* — Ranodhi Serrao (57) ABSTRACT

System and method for generating a resource assignment recommendation for a data center network, including receiving a resource request for a requesting application that indicates a requested resource rate and a requested resource time for one or more network links; computing, based on historic resource utilization data for the requesting application, a predicted resource utilization for the requesting application; computing a recommendation for the resource request based on the requested resource rate, requested resource time, and the predicted resource utilization; and providing the recommendation to a resource assignment controller.

17 Claims, 10 Drawing Sheets

(56) References Cited

U.S. PATENT DOCUMENTS

| | | | |
|---|---|---|---|
| 11,171,825 B2* | 11/2021 | Weldemariam | H04L 41/0806 |
| 11,188,408 B2* | 11/2021 | Mahindru | G06F 11/0793 |
| 11,467,872 B1* | 10/2022 | Mauer | G06F 9/5044 |
| 2006/0259621 A1 | 11/2006 | Ranganathan | |
| 2015/0286507 A1* | 10/2015 | Elmroth | G06F 9/5061 |
| | | | 718/104 |
| 2019/0349251 A1* | 11/2019 | Weldemariam | H04L 41/0895 |
| 2020/0004590 A1* | 1/2020 | Tang | G06F 9/5005 |
| 2020/0097352 A1* | 3/2020 | Mahindru | G06F 11/079 |
| 2020/0099592 A1* | 3/2020 | Mahindru | H04L 41/5019 |
| 2020/0104184 A1* | 4/2020 | Subramanian | G06N 3/04 |
| 2020/0106677 A1 | 4/2020 | Pathak | |

FOREIGN PATENT DOCUMENTS

| | | |
|---|---|---|
| CN | 111970383 A | 11/2020 |
| WO | 2013004497 A1 | 1/2013 |

OTHER PUBLICATIONS

D. A. L. Perez, Q. Xiang, C. E. Rothenberg, S. Randriamasy, L. M. Contreras, and B. Ohlman, "Towards deep network & application integration: Possibilities, challenges, and research directions," in Proceedings of the 2020 Workshop on Network Application Integration/CoDesign, NAI@SIGCOMM 2020, Virtual Event, USA, Aug. 14, 2020. ACM, 2020, pp. 1-7. [Online]. Available: https://doi.org/10.1145/3405672.3405804.

A. Chowdhary, D. Huang, A. Alshamrani, M. Kang, A. Kim, and A. Velazquez, "TRUFL: Distributed Trust Management framework in SDN," in ICC 2019-2019 IEEE International Conference on Communications (ICC). IEEE, 2019, pp. 1-6.

A. L. Aliyu, A. Aneiba, M. Patwary, and P. Bull, "A trust management framework for Software Defined Network (SDN) controller and network applications," Computer Networks, vol. 181, p. 107421, 2020. [Online]. Available: https://www.sciencedirect.com/science/article/pii/S1389128620311105.

S. Burikova, J. Lee, R. Hussain, I. Sharafitdinova, R. Dzheriev, F. Hussain, S. Sharieh, and A. Ferworn, "A trust management framework for software defined networks-based internet of things," in 2019 IEEE 10th Annual Information Technology, Electronics and Mobile Communication Conference (IEMCON), 2019, pp. 0325-0331.

B. Minu, E. McMiller, J. Kyser, F. Zenone, G. Walker, S. Cilenti, E. Sturzinger, and K. Duncan, "Establishing and Maintaining Multivariate Trust in a Hierarchical SDN," in 2020 IEEE SoutheastCon, 2020, pp. 1-7.

M. Boussard, S. Papillon, P. Peloso, M. Signorini, and E. Waisbard, "STewARD:SDN and blockchain-based Trust evaluation for Automated Risk management on IoT Devices," in IEEE INFOCOM 2019—IEEE Conference on Computer Communications Workshops (INFOCOM WKSHPS), 2019, pp. 841-846.

J. Chen, Z. Tian, X. Cui, L. Yin, and X. Wang, "Trust architecture and reputation evaluation for internet of things," Journal of Ambient Intelligence and Humanized Computing, vol. 10, Aug. 2019.

K. Kalkan, "SUTSEC: SDN Utilized trust based secure clustering in IoT," Computer Networks, vol. 178, p. 107328, 2020. [Online]. Available: https://www.sciencedirect.com/science/article/pii/S1389128619310783.

W. Meng, K. R. Choo, S. Furnell, A. V. Vasilakos, and C. W. Probst, "Towards bayesian-based trust management for insider attacks in healthcare software-defined networks," IEEE Transactions on Network and Service Management, vol. 15, No. 2, pp. 761-773, 2018.

Z. Zaheer, H. Chang, S. Mukherjee, and J. Van der Merwe, "eZTrust: Network-Independent Zero-Trust Perimeterization for Microservices," in Proceedings of the 2019 ACM Symposium on SDN Research, ser. SOSR '19. New York, NY, USA: Association for Computing Machinery, 2019, p. 49-61. [Online]. Available: https://doi.org/10.1145/3314148.3314349.

D. S. Marcon, M. C. Neves, R. R. Oliveira, L. P. Gaspary, and M. P. Barcellos, "PredCloud: Providing predictable network performance in large-scale OpenFlow-enabled cloud platforms through trust-based allocation of resources," Computer Communications, vol. 91-92, pp. 44-61, 2016. [Online]. Available: https://www.sciencedirect.com/science/article/pii/S0140366416302687.

A. Greenberg and D. Bansal, "Automatically Preventing and Remediating Network Abuse," U.S. Pat. No. 10,187,410 B2, Jan. 2019. [Online]. Available: https://patentimages.storage.googleapis.com/2a/f8/25/91a929ed4103f6/US10187410.pdf.

Y. Ruan and A. Durresi, "A Trust Management Framework for Cloud Computing Platforms," in 2017 IEEE 31st International Conference on Advanced Information Networking and Applications (AINA), 2017, pp. 1146-1153.

E. G. Abdallah, M. Zulkernine, Y. X. Gu, and C. Liem, "Trust-cap: A trust model for cloud-based applications," in 2017 IEEE 41st Annual Computer Software and Applications Conference (COMPSAC), vol. 2, 2017, pp. 584-589.

S. O. Ogundoyin and I. A. Kamil, "A trust management system for fog computing services," Internet of Things, vol. 14, p. 100382, 2021. [Online]. Available: https://www.sciencedirect.com/science/article/pii/S2542660521000263.

https://tools.ietf.org/html/rfc7285.

https://datatracker.ietf.org/doc/draft-li-6man-app-aware-ipv6-network/.

S5-203248, China Mobile et al, Modification of the resource utilization analysis use case, 3GPP TSG-SA5 Meeting #131e, e-meeting May 25-Jun. 3, 2020, 3 pages. 2020.

* cited by examiner

| Rule | Resource utilization prediction block | | |
|---|---|---|---|
| | Antecedent | | Consequent |
| | *If* Application's rate utilization prediction | *And* Application's time utilization prediction | *Then* Application's overall resource utilization prediction |
| 1 | StrongWaster | Exceeded | WeakWaster |
| 2 | StrongWaster | NotExceeded | StrongWaster |
| 3 | WeakWaster | Exceeded | Right |
| 4 | WeakWaster | NotExceeded | WeakWaster |
| 5 | Right | Exceeded | WeakAggressor |
| 6 | Right | NotExceeded | Right |
| 7 | WeakAggressor | Exceeded | StrongAggressor |
| 8 | WeakAggressor | NotExceeded | WeakAggressor |
| 9 | StrongAggressor | Exceeded | StrongAggressor |
| 10 | StrongAggressor | NotExceeded | StrongAggressor |

Resource request block

| Rule | Antecedent | | Consequent |
|---|---|---|---|
| | *If* | *And* | *Then* |
| | Application's rate request | Application's time request | Application's overall resource request |
| 1 | VeryLow | VeryLow | VeryLow |
| 2 | VeryLow | Low | Low |
| 3 | VeryLow | Medium | Low |
| 4 | VeryLow | High | Medium |
| 5 | VeryLow | VeryHigh | Medium |
| 6 | Low | VeryLow | Low |
| 7 | Low | Low | Low |
| 8 | Low | Medium | Medium |
| 9 | Low | High | Medium |
| 10 | Low | VeryHigh | Medium |
| 11 | Medium | VeryLow | Low |
| 12 | Medium | Low | Medium |
| 13 | Medium | Medium | Medium |
| 14 | Medium | High | Medium |
| 15 | Medium | VeryHigh | High |
| 16 | High | VeryLow | Medium |
| 17 | High | Low | Medium |
| 18 | High | Medium | Medium |
| 19 | High | High | High |
| 20 | High | VeryHigh | High |
| 21 | VeryHigh | VeryLow | Medium |
| 22 | VeryHigh | Low | Medium |
| 23 | VeryHigh | Medium | High |
| 24 | VeryHigh | High | High |
| 25 | VeryHigh | VeryHigh | VeryHigh |

Link decision block

| Antecedent | | Consequent |
|---|---|---|
| *If* | *And* | *Then* |
| Application's overall resource utilization prediction | Application's overall resource request | Link decision |
| StrongWaster | VeryLow | Yes |
| StrongWaster | Low | No |
| StrongWaster | Medium | No |
| StrongWaster | High | No |
| StrongWaster | VeryHigh | No |
| WeakWaster | VeryLow | Yes |
| WeakWaster | Low | Yes |
| WeakWaster | Medium | No |
| WeakWaster | High | No |
| WeakWaster | VeryHigh | No |
| Right | VeryLow | Yes |
| Right | Low | Yes |
| Right | Medium | Yes |
| Right | High | Yes |
| Right | VeryHigh | Yes |
| WeakAggressor | VeryLow | Yes |
| WeakAggressor | Low | Yes |
| WeakAggressor | Medium | No |
| WeakAggressor | High | No |
| WeakAggressor | VeryHigh | No |
| StrongAggressor | VeryLow | Yes |
| StrongAggressor | Low | No |
| StrongAggressor | Medium | No |
| StrongAggressor | High | No |
| StrongAggressor | VeryHigh | No |

RESOURCE ALLOCATION IN DATA CENTER NETWORKS

RELATED APPLICATIONS

This application claims benefit of and priority to U.S. Provisional Patent Application No. 63/274,005 filed Oct. 31, 2021, the contents of which is incorporated herein by reference.

FIELD

This disclosure relates generally to resource allocation in data center networks, and in particular to allocation of network rate resources and time resources.

BACKGROUND

Data center networks (DCNs) often host applications for different application vendors. The different applications that are hosted by the DCN for vendors can have different requirements in terms of data speeds, packet loss, completion times, etc. Data center network-application integration (DC-NAI) can be applied in DCNs to enable applications to request resources from the DCN. DC-NAI is promising for DCNs to facilitate resource assignment.

A DC-NAI approach can enable DCNs to more efficiently assign network resources to the applications hosted for different vendors. However, there may be cases where a requesting application may not properly use the resources it is assigned. Special attention has to be given to selfish applications that may request more DCN resources than they actually need, which can exhaust and/or cause inefficient allocation of DCN resources. Moreover, selfish applications may not abide by the amount of assigned resources and exceed them, which can impact the quality of service (QoS) experience of other existing applications.

The aforementioned challenge necessitates the introduction of a mechanism that can monitor the behavior of resource requesting applications. Such a mechanism can be used to determine a trust level for a requesting application. By determining trust levels for requesting applications, the DCN can improve its resource allocation efficiency.

Various solutions have been proposed for monitoring and tracking the behavior of requesting applications in the context of software defined networking (SDN) and DCN. However a number of the proposed solutions are primarily directed to detecting malicious applications behavior (e.g., accessing unauthorized resources or performing illegal operations), rather than determining if non-malicious applications can be trusted to use their assigned resources effectively.

In some proposed solutions, trust levels for applications must be specified in advance, are not updated based on an application's behavior in the network, and do not guarantee that a trusted application will not act selfishly later.

Accordingly, there is a need for DCN resources assignment solution that can enable selfish application behavior to be detected and discouraged.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One example aspect includes a computer implemented method for resource assignment recommendation for a data center network. The computer implemented method includes receiving a resource request for a requesting application that indicates a requested resource rate and a requested resource time for one or more network links; computing, based on historic resource utilization data for the requesting application, a predicted resource utilization for the requesting application; computing a recommendation for the resource request based on the requested resource rate, requested resource time and the predicted resource utilization; and providing the recommendation to a resource assignment controller.

Other embodiments of this aspect include corresponding computer systems, apparatus, and computer programs recorded on one or more computer storage devices, each configured to perform the actions of the methods.

In some example aspects of the preceding aspect, the recommendation is one of a recommendation to accept the resource request and a recommendation to deny the resource request.

In some example aspects of one or more of the preceding aspects, the requested resource rate is a network bandwidth amount and the requested resource time is a time duration for which the network bandwidth amount is requested.

In some example aspects of one or more of the preceding aspects, the historic resource utilization data is retrieved from a tracking repository, and the method may include: receiving, subsequent to providing the recommendation, actual resource utilization data by the requesting application corresponding to the resource request, the actual resource utilization data indicating an actual resource rate utilization and an actual resource time utilization; and storing the actual resource utilization data for the requesting application at the tracking repository as part of the historic utilization data.

The historic resource utilization data for the requesting application may include a sequence of actual resource rate utilizations and actual resource time utilizations corresponding to a sequence of historic resource requests by the requesting application. The sequence of actual resource rate utilizations may indicate, for each of the actual resource rate utilizations in the sequence, and a relative utilization of the resource rate compared to a requested resource rate indicated in the corresponding historic resource request. The sequence of actual resource time utilizations may indicate, for each of the actual resource time utilizations in the sequence, a relative utilization of the resource time compared to a requested resource time indicated in the corresponding historic resource request.

The predicted resource utilization for the requesting application may include a rate utilization behavior prediction and a time resource utilization behavior prediction.

In some example aspects of one or more of the preceding aspects, the predicted resource utilization is computed using a machine learning based time series prediction model that maps the sequence of actual resource time utilizations to: (i) one of a plurality of candidate rate resource behavior categories to generate the rate utilization behavior prediction, and (ii) one of a plurality of candidate time resource behavior categories to generate the time resource utilization behavior prediction. The machine learning based time series prediction model may use a long short-term memory (LSTM) network.

In some example aspects of one or more of the preceding aspects, the method includes computing, for at least one of the network links, a link resource utilization prediction based on capacity of the at least one network link and the requested resource rate and the requested resource time; and determining, for the at least one network link, a link decision based on the link resource utilization prediction and the predicted resource utilization, the link decision indicating if the at least one network link should be used in fulfilling the resource request or should not be used in fulfilling the resource request. Computing the recommendation for the resource request is based at least in part on the link decision.

The predicted resource utilization for the requesting application may include: (i) a rate utilization behavior prediction that indicates a rate utilization behavior category for the requesting application selected from a set of candidate rate utilization behavior categories, and (ii) a time resource utilization behavior prediction that indicates a time resource utilization behavior category for the requesting application selected from a set of candidate time resource utilization behavior categories. Computing the link resource utilization prediction may include mapping the available capacity of the at least one network link, the requested resource rate and the requested resource time to one of a plurality of candidate link resource utilization prediction categories. Fuzzy logic can be used for determining the link decision.

In example aspects of one or more of the preceding aspects, the one or more network links may include a plurality of network links that collectively form a network path, and respective link resource utilization predictions are computed and respective link decisions are determined for each of the plurality of network links, where computing the recommendation for the resource request may include mapping, using a machine learning based model, to one of two candidate recommendation decisions for the network path, based on the respective link decisions for each of the plurality of network links and available resource data for each of the plurality of network links.

The method may include training the machine learning based model to map to candidate recommendation decisions that discourage selfish resource requests by requesting applications.

In some examples, the mapping to one of two candidate recommendation decisions is also based on a priority classification for the requesting application.

In some examples a machine learning based model used to determine the recommendation decisions may include a deep reinforcement learning neural network model.

Implementations of the described techniques may include hardware, a method or process, or computer software on a computer-accessible medium.

In a further aspect, an evaluation system is disclosed that includes one or more processor circuits and one or more non-transient electronic memories that store instructions that, when executed by the one or more processor circuits, configure the evaluation system to perform the method of any of the preceding aspects.

In a further aspect, a non-transient computer readable memory is disclosed that stores instructions that, when executed by the one or more processor circuits, configure the one or more processor circuits to perform the method of any of the preceding aspects.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

The present disclosure presents methods and systems that can be applied in a data center network (DCN) to enable efficient assignment of network resources by a DCN controller. The disclosed systems and methods may, in at least some DCN environments, enable DCN resource assignments that will encourage hosted applications to use resources efficiently and thereby enhance overall DCN resource usage.

In one example, a trainable evaluation module is disclosed that can be integrated into a control plane of an SDN-based DCN to evaluate application resource requests for applications and provide recommendations that can be used by a resource assignment controller (for example, a DCN controller) to assign the network resources efficiently and improve DCN resource utilization.

As used here, a "module", "engine" and "component" can refer to a combination of a hardware processing circuit and machine-readable instructions (software and/or firmware) executable on the hardware processing circuit. A hardware processing circuit can include any or some combination of a microprocessor, a core of a multi-core microprocessor, a microcontroller, a programmable integrated circuit, a programmable gate array, a digital signal processor, or another hardware processing circuit.

Figure 1:
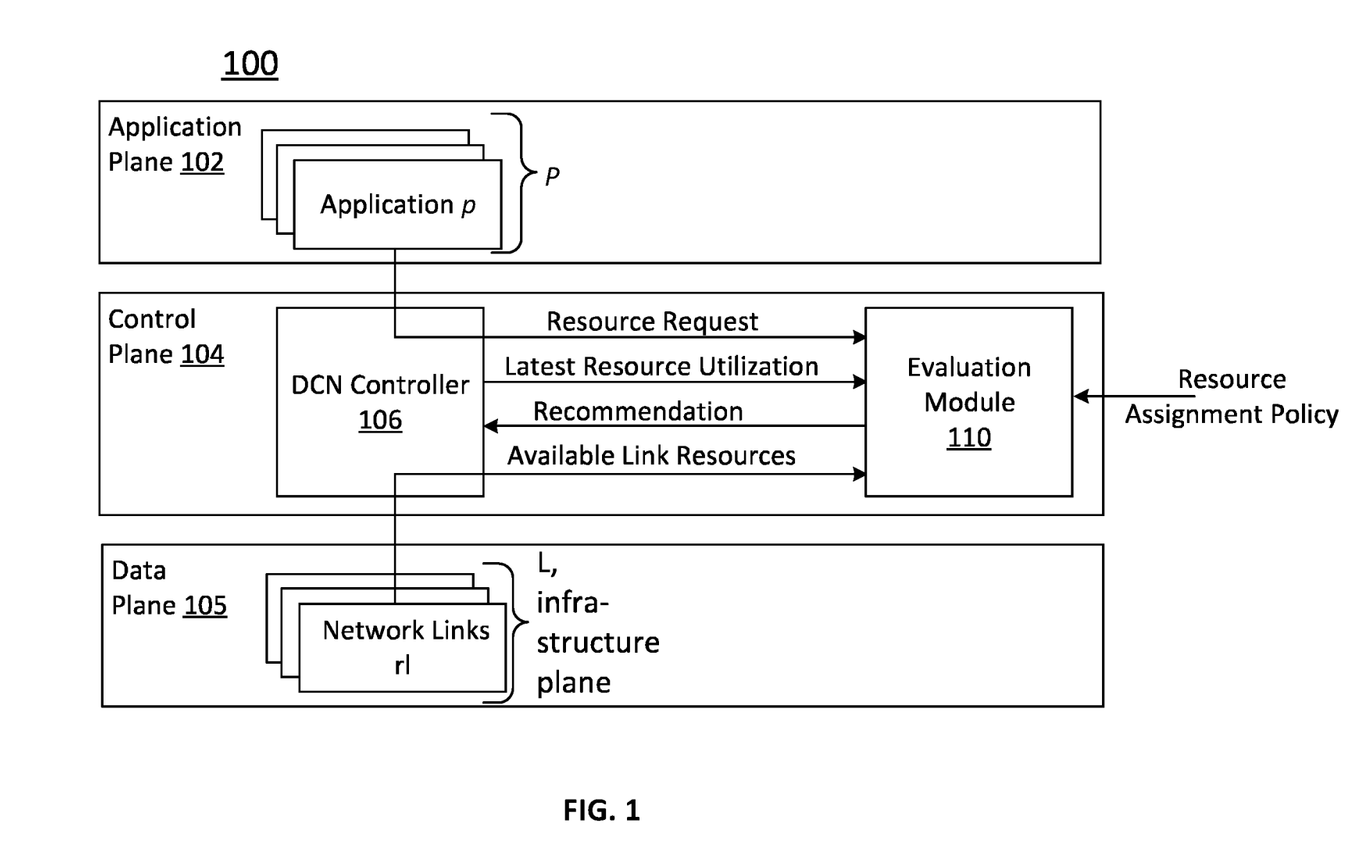
FIG. 1 is a block diagram illustration of a data center network (DCN) in which aspects of the current disclosure can be implemented.

FIG. 1 is a block diagram illustration of a DCN 100 in which aspects of the current disclosure can be implemented. DCN 100 hosts a set P of different applications p that exist in an application plane 102 (for example, distributed machine learning applications among other types of applications) for different application providers (e.g., different Software as a Service (SaaS) vendors and/or software vendors and/or digital content vendors). DCN 100 includes plurality of network resources, including a set L of network links rl that can exist in an infrastructure plane. A centralized controller 106 that exists in a control plane 104 generates network resource assignments for the applications p. A data plane 104 (also known as a forwarding plane) provides an interface between the control plane 104 and the infrastructure plane. In the example of FIG. 1, the DCN is a software defined networking (SDN) based DCN. Information signals can be exchanged between an application plane 102, control plane 104 and data plane 105.

In an example embodiment, evaluation module 110 exists in the control plane 104 with DCN controller 106. For example, evaluation module 110 may be a software defined plug-in module that can be used with an existing DCN controller 106. In some other examples, some or all of the functionality of evaluation module 110 can integrated as software defined components of the DCN controller.

In the illustrated example, evaluation module 110 receives four inputs:

(1) Application Resource Request. The application resource request indicates network resources that are proposed by the DCN controller 110 for assignment to a requesting application p. The application resource request can be assembled by the DCN controller 106 based on a corresponding resource request sent to the DCN controller 106 from the application plane 102 by the requesting application p. In example embodiments, the network resources specified in an application resource request can include: (i) a set of one or more network links (referred to herein as a requested link set), (ii) a requested resource rate and (iii) a requested resource time. The requested link set is a set of one or more available network links the DCN controller 110 has allocated for the requesting application. The requested link set collectively define a link path. The requested resource rate can indicate an amount of bandwidth (for example, in Mbps) for the link set. The requested resource time can indicate a time duration (for example, in ms) for the requested resource rate on the requested link set.

(2) Latest Resource Utilization Data. Latest resource utilization data is generated by the DCN controller 106 based on the requesting application's actual resource usage of the network resources it was most recently assigned by the DCN controller 110 prior to the current network resource request by the requesting application. For example, latest resource utilization data can indicate how much of the network resources last assigned for that requesting application ended up being used. Latest resource utilization data can include an actual application rate utilization and an actual application time duration utilization. In this regard, after allocating a specified resource rate and resource time, the DCN controller 106 monitors the requesting application's actual rate and time duration utilization relative to the assigned amounts to determine the actual application rate utilization and actual application time duration utilization. The latest resource utilization data for a requesting application can be sent to the evaluation module 110 once it is generated, or the next time the application asks the DCN controller to assign new resources.

(3) Available Link Resources: Available Link Resources refers to the available bandwidth on the requested link set that is being proposed by the DCN controller 106, and is assembled by DCN controller 106 based on information received by the DCN controller 106 from the data plane 105 about the network links.

(4) Resource Assignment Policy: Resource assignment policies include predetermined policy values that may, for example, be assigned by DCN administrators. The policy values can for example, indicate relative application priority classes for at least some of the applications that can be used to prioritize resource requests.

Based on these inputs, the evaluation module 110 computes a recommendation, which may for example be a resource assignment decision, that is provided as output back to the DCN controller 106. The computed recommendation can be based on an evaluation that considers if an application is well-behaved or selfish. A well-behaved application uses most of the network resources that are assigned to it by the DCN controller 106 in response to a resource request. On the other hand, a selfish application does not use the assigned resources efficiently, which can cause network resources to be under-utilized or over-utilized.

An example of the operation of DCN system 100 to perform a resource assignment task based on a recommendation of the evaluation module 110 will now be described along with details of an example configuration of evaluation module 110. According to one example, a requesting application p submits a resource request $R^p_t = \{RR^p_t, TR^p_t\}$ at time t for network resources to send traffic from a source node to a destination node, where $RR^p_t$ specifies a resource rate request (for example, bandwidth requirement in Mbps) and $TR^p_t$ specifies a resource time request (for example, time duration in ms). Once the DCN controller 102 receives resource request $R^p_t = \{RR^p_t, TR^p_t\}$, DCN controller 102 finds, for the requested link set, the best link set (e.g., link path) for providing service to the requesting application p. In the illustrated example, such a determination is made based on assumption that the links in the link path are expected to provide the same resource rate that the application has requested. The DCN controller 102 then generates application resource request query $Q^p_t$ $\{LS^p_t, ALR^p_{t-1}, ALT^p_{t-1}, RR^p_t, TR^p_t\}$ where $LS^p_t$ identifies the requested link set. $ALR^p_{t-1}$, $ALT^p_{t-1}$ indicate the latest actual resource rate utilization and latest actual resource time utilization, which may for example be expressed as a percentage of assigned resource that was used (e.g., 50%) or ratio of used resource to assigned resource (e.g., 0.5, when ½ of the assigned resource was actually used). The DCN controller 102 sends the query $Q^p_t$ as an application resource request to the evaluation module 110 for a recommendation. Additionally, the DCN controller assembles data about available link resources at time t from the infrastructure plane via the data plane 105, and sends the available link resources data to the evaluation module 110.

Figure 2:
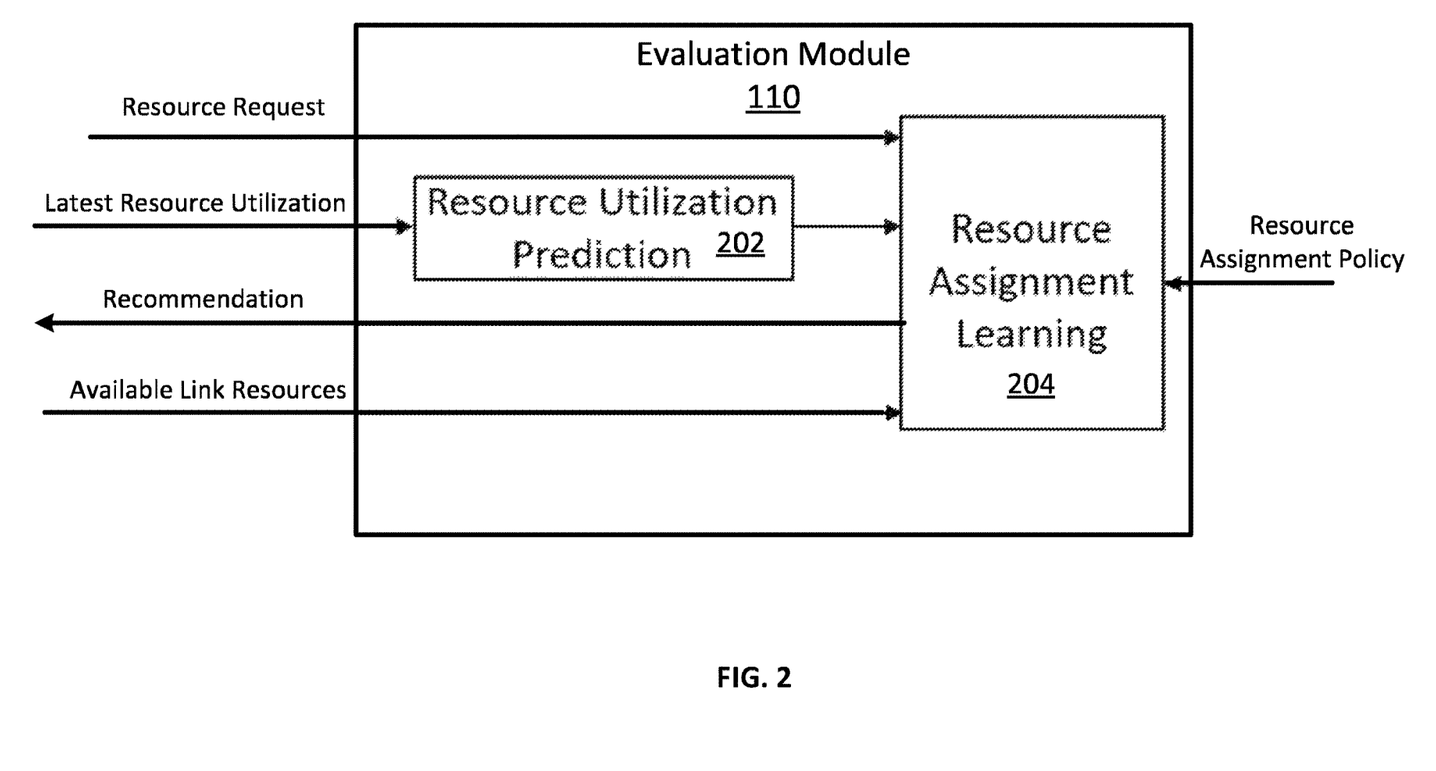
FIG. 2 shows a block diagram of an evaluation module that can be used in the DCN of FIG. 1.
Figure 3:
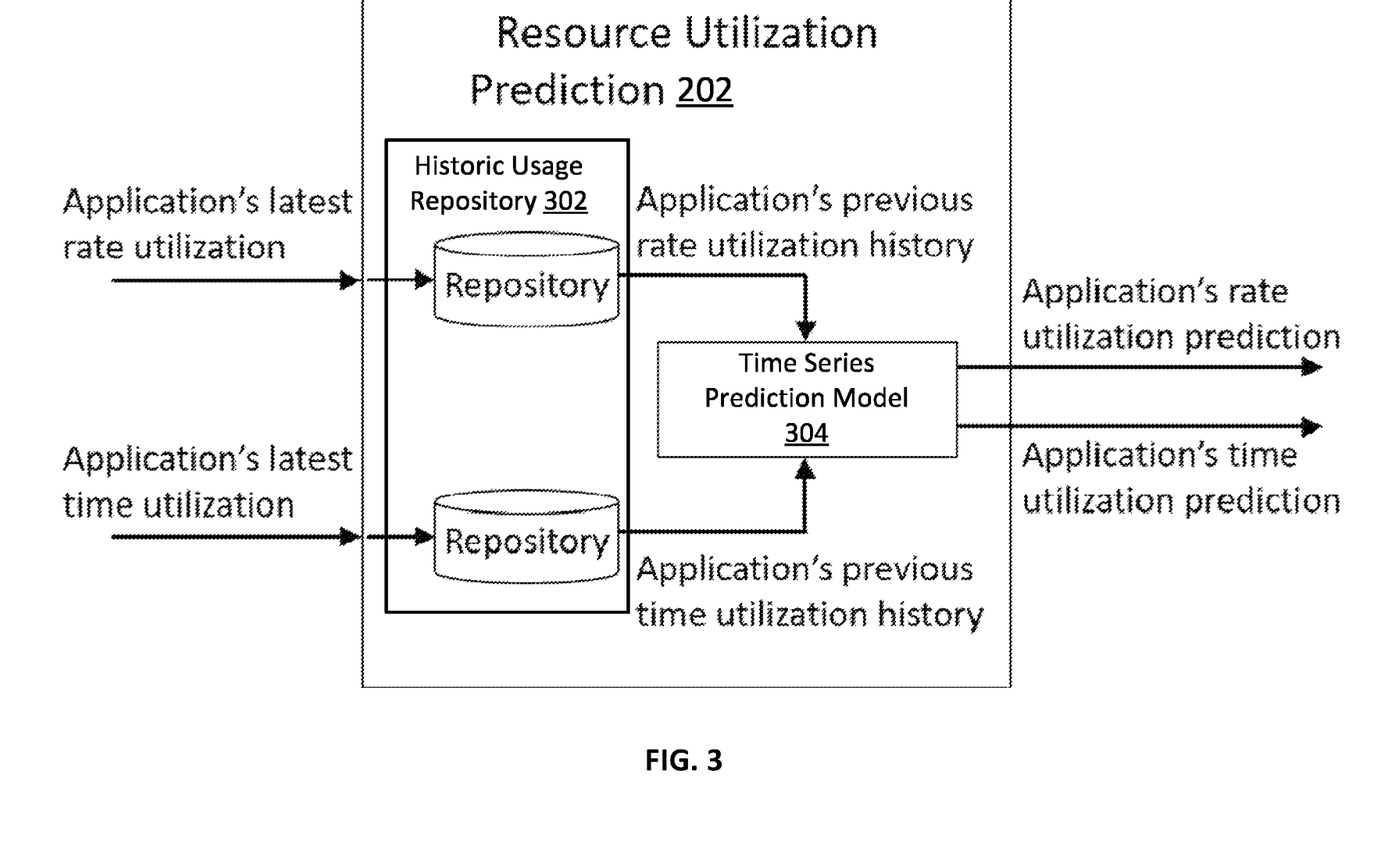
FIG. 3 shows a block diagram of a resource utilization prediction component of the evaluation module of FIG. 2.

With reference to FIG. 2, in an example embodiment, evaluation module 110 includes a resource utilization prediction component 202, and a resource assignment learning component 204. As shown in FIG. 3, resource utilization prediction component 202, includes a historic usage repository 302 and a time series prediction model 304. As used herein, "model" refers to a software enabled function that is configured to generate one or more outputs based on a set of inputs.

The latest resource utilization data for the requesting application p, for example, the requesting application's latest resource rate utilization $ALR^p_{t-1}$ and latest resource rate utilization $ALT^p_{t-1}$, provided by DCN controller 196 are stored in the historic usage repository 302. Over time, the historic usage repository 302 stores a time series set of historic resource utilization data for each of the DCN applications included in application set P. The historic resource utilization data for each application is indicative of the historic behavior of the respective application as being a selfish application or a well-behaved application.

Time series prediction model 304 is configured to predict an expected application resource utilization for the requesting application p by applying a time-series predictor. More specifically, time series prediction model 304 produces an application resource rate utilization prediction $ALR^p_{t,pred}$ and an application resource time utilization prediction $ALT^p_{t,pred}$. In one example, a long short-term memory (LSTM) network is used to implement time series prediction model 304. The LSTM network takes a sequence of the requesting application's previous resource rate and resource time utilization and performs a resource utilization pattern profile prediction to generate application resource rate utilization prediction $ALR^p_{t,pred}$ and an application resource time utilization prediction $ALT^p_{t,pred}$ that are provided to resource assignment learning component 204.

In summary, the resource utilization prediction component 202 has a repository of all previous applications resource usages. Therefore, it can form a time series process for the previous resource usage of each application. Then, via a predictor component (e.g., prediction model 304), the resource utilization prediction component 202 can predict the expected application resource usage based on an applications previous behavior. As the hosted applications in DCNs have different vendors/developers with different behaviors, the time series prediction model 304 may be implemented using a number of alternative time-series modelling processes, including for example one of long short-term memory LSTM network, an AutoRegressive Integrated Moving Average (ARIMA) model, or a Generalized Autoregressive Conditional Heteroskedasticity (GARCH) model.

Figure 4:
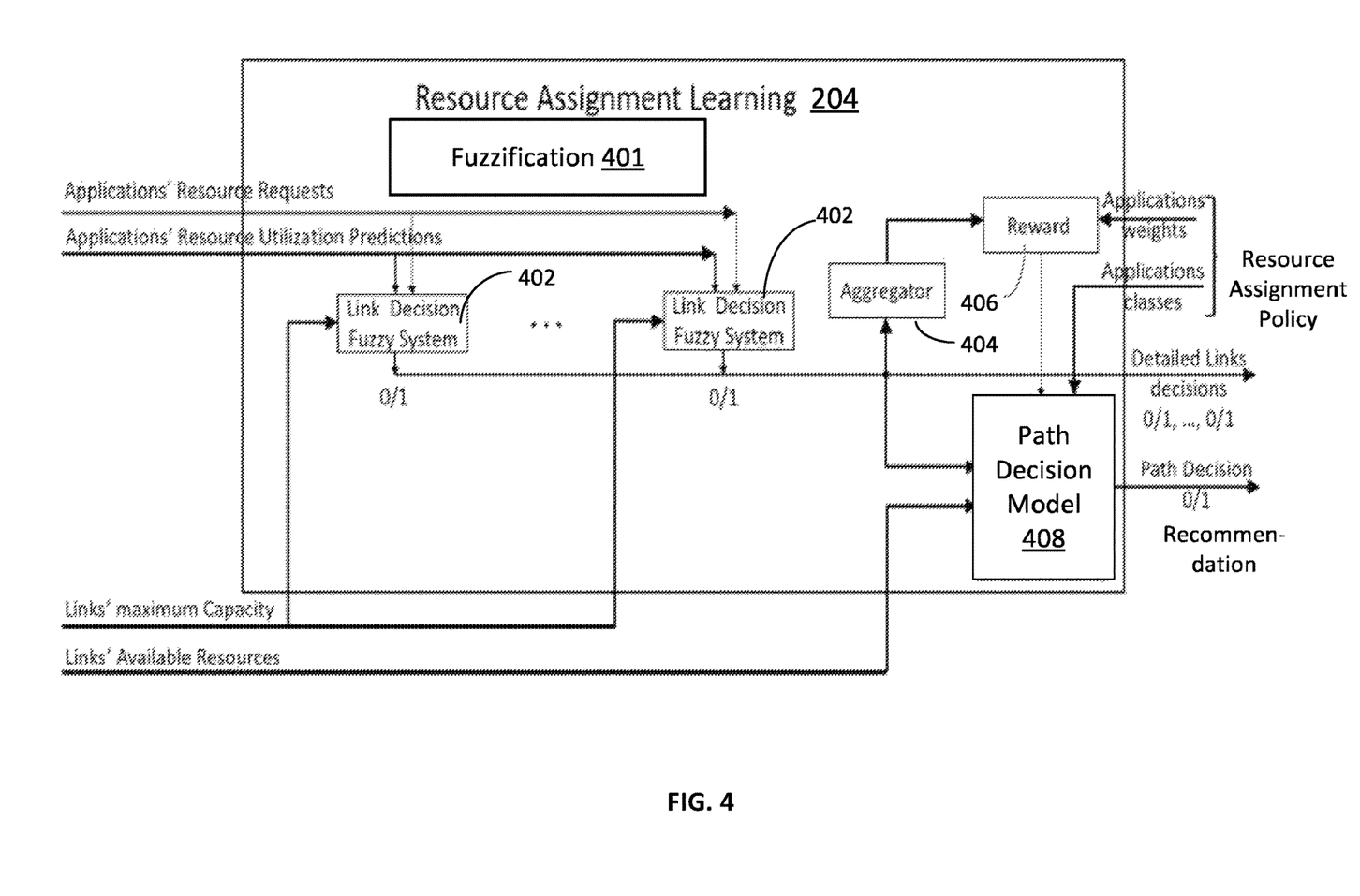
FIG. 4 shows a block diagram of a resource assignment learning component of the evaluation module of FIG. 2.

As indicated in FIG. 4, in the illustrated example, the resource assignment learning component 204 employs the following two sub-components: a fuzzy logic link decision system 402 for computing individual decisions for each resource link in the resource path individually, and a reinforcement learning based path decision model 408 for providing a recommendation decision for the overall resource path. In addition to resource rate utilization prediction $ALR^p_{t,pred}$ and application resource time utilization prediction $ALT^p_{t,pred}$ provided by resource utilization prediction model, assignment learning component 204 receives as inputs from the DCN controller 105: the requesting application's resource request, including requested resource rate $RR^p_t$, requested resource time duration $RT^p_t$, and requested link set $LS^p_t$ (which defines the link path selected by the DCN controller 104 to satisfy the requesting application p's resource request), and the currently available link resources for the respective network links in the link set $LS^p_t$. Assignment learning component 204 also receives the resource assignment policy, which can include application class information that can specify priorities of resource requesting applications.

Referring to FIG. 4, in example embodiments, evaluation module 110 includes a fuzzification engine 401 that is configured to apply predefined membership functions to map the continuous or crisp variable inputs to resource assignment learning component 204 to respective fuzzy membership categories. By way of example, the application's resource rate utilization prediction $ALR^p_{t,pred}$ can be fuzzified by fuzzification engine 401 to a category corresponding to one of the following linguistic terms: Strong Waster, WeakWaster, Right, WeakAggressor, and StrongAggressor. The linguistic terms Strong Waster, Right, and StrongAggressor are used to describe the resource utilization behaviors. Strong Waster strongly wastes the amount of assigned resources. Right uses almost the exact amount of assigned resources, and StrongAggressor strongly exceeds the amount of assigned resources. The application's resource time utilization prediction $ALT^p_{t,pred}$, can be fuzzified by fuzzification engine 401 to a category corresponding to one of the following linguistic terms: Exceeded and NotExceeded, to indicate whether an application has exceeded the allowed time a resource has been dedicated for it or not.

It will be noted that the use of fuzzy linguistic terms and fuzzy logic, and the specific linguist terms and fuzzy rules listed in this disclosure are non-limiting examples. Different solutions, including for example, defined rules based solutions or machine learn based solutions, can alternatively be used in other examples to determine resource utilization predictions and link decisions.

Resource rate requests $RR^p_t$ and resource time requests $TR^p_t$ can be mapped to the following linguistic terms: VeryLow, Low, Medium, High, and VeryHigh. These linguistic terms are used to describe the amount of resources an application has requested. For example, the term VeryHigh means that most of the available resources on a given link is requested. These determinations can be made based on received inputs about the maximum capacity of each of the network links in the link set, which may for example, be provided by the DCN controller 106 along with the available link resources as part of the requesting application resource request query In the illustrated embodiment, resource assignment learning component 204 generates a recommendation that can include two sets of outputs: 1) detailed link decisions which specify whether the requested resource should be assigned on a given link in the path or not, and 2) an overall path decision which aggregates the detailed links' decisions and specifies whether the requested resource should be assigned on the path or not. The decisions for each link is provided by a respective fuzzy logic link decision system 410 implemented using the fuzzy logic theory, thus providing a means for representing uncertainty in the decision making process. Each fuzzy logic link decision system 410 computes a respective link decision, for example, 1 for approval and 0 for rejection. The group of links' decisions are fed to the path decision reinforcement learning path decision model 408 to give the final decision for the path. The use of reinforcement learning enables the resource assignment learning component 204 to use semi-supervised training to improve its performance by receiving feedback about the DCN environment.

It will be noted that the use of fuzzy linguistic terms and fuzzy logic, and the specific linguist terms and fuzzy rules listed in this disclosure are non-limiting examples. Different solutions, including for example, defined rules based solutions or machine learn based solutions, can alternatively be used in other examples to determine resource utilization predictions and link decisions.

In example embodiments, the detailed link decisions are not included as part of the output recommendation. However, if included, the detailed link decisions can enable the DCN controller 106 to determine problematic links whenever the path decision reinforcement learning path decision model 408 rejects allocating the path to the application. The detailed link decisions can be used by the DCN controller 106 to determine which links should not be included in the path in a follow up proposal included in a subsequent application resource request query to the evaluation module 110.

Figure 5:
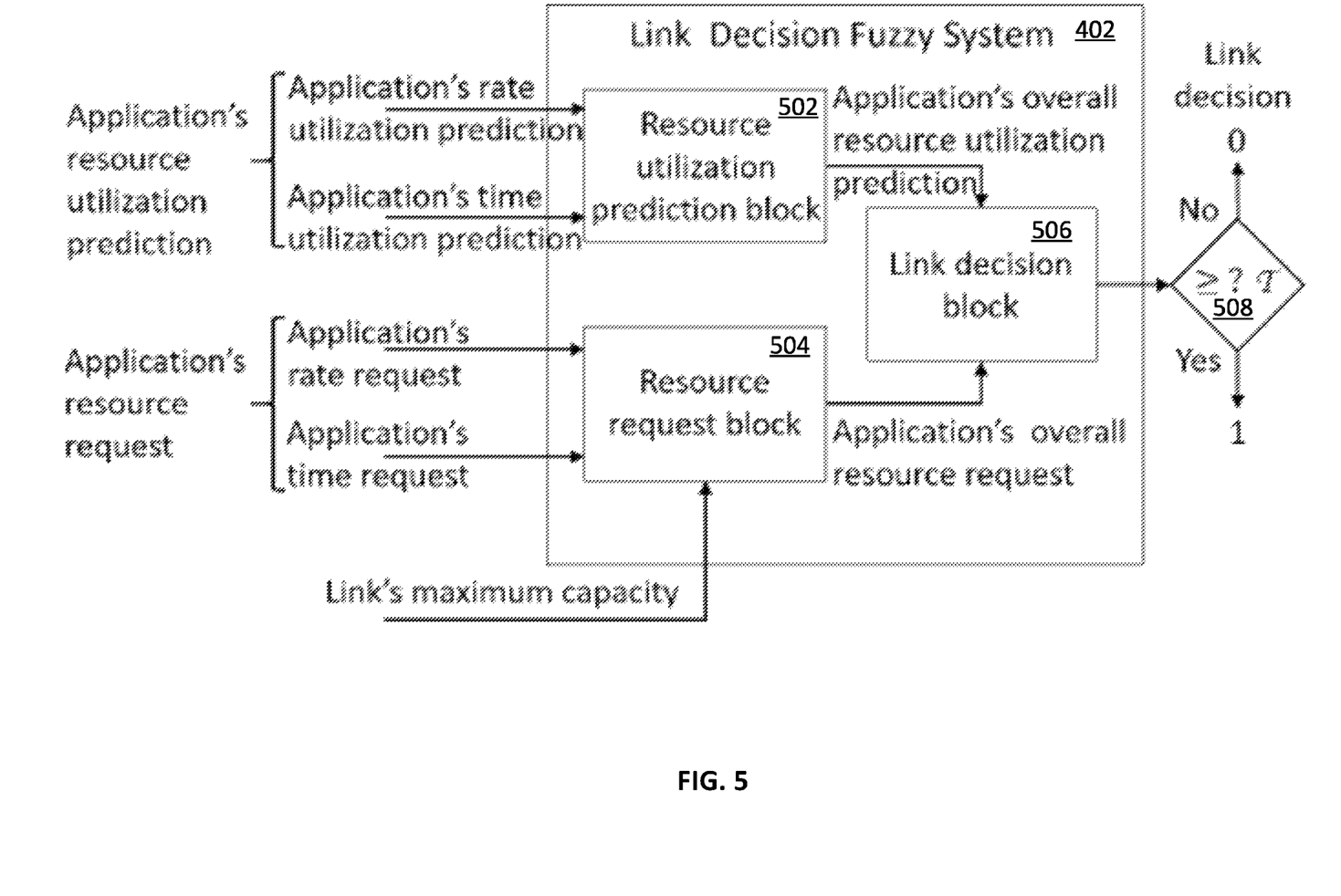
FIG. 5 shows a block diagram of a fuzzy logic link decision system of the resource assignment learning component of FIG. 4.

An example of a fuzzy logic link decision system 402, also referred to as a link decision fuzzy system (LDFS), is shown in FIG. 5. The LDFS 402 approves or rejects an application's request for a corresponding link (e.g., a respective link in the network link set) using fuzzy logic. In some examples, the LDFS 402 is designed in a hierarchical fashion so as to decrease the overall number of required fuzzy rules, and may for example be composed of three blocks: a resource utilization prediction block 502, a resource request block 504, and the link decision block 506. The LDFS 402 receives the following inputs: the application's resource utilization prediction, the application's resource request, and the link's maximum capacity, and based on these inputs either accepts or rejects an application's resource request for the specific link that corresponds to the LDFS 402.

In the illustrated example, the resource utilization prediction block 502, takes the application's resource utilization prediction, which includes the fuzzified resource rate utilization prediction $ALR^p_{t,pred}$ and the fuzzified resource time duration utilization prediction $ALT^p_{t,pred}$, and predicts an overall resource utilization for the requesting application. Similarly, the resource request block 504 takes the application's resource request, which includes the application's resource rate request $RR^p_t$ and the application's resource time duration request $TR^p_t$, and predicts an overall resource request for the applicant. Both the application's overall resource utilization prediction and the application's overall resource request are fed to the link decision block which either approves or declines the application's request for a specific link.

Figure 6:
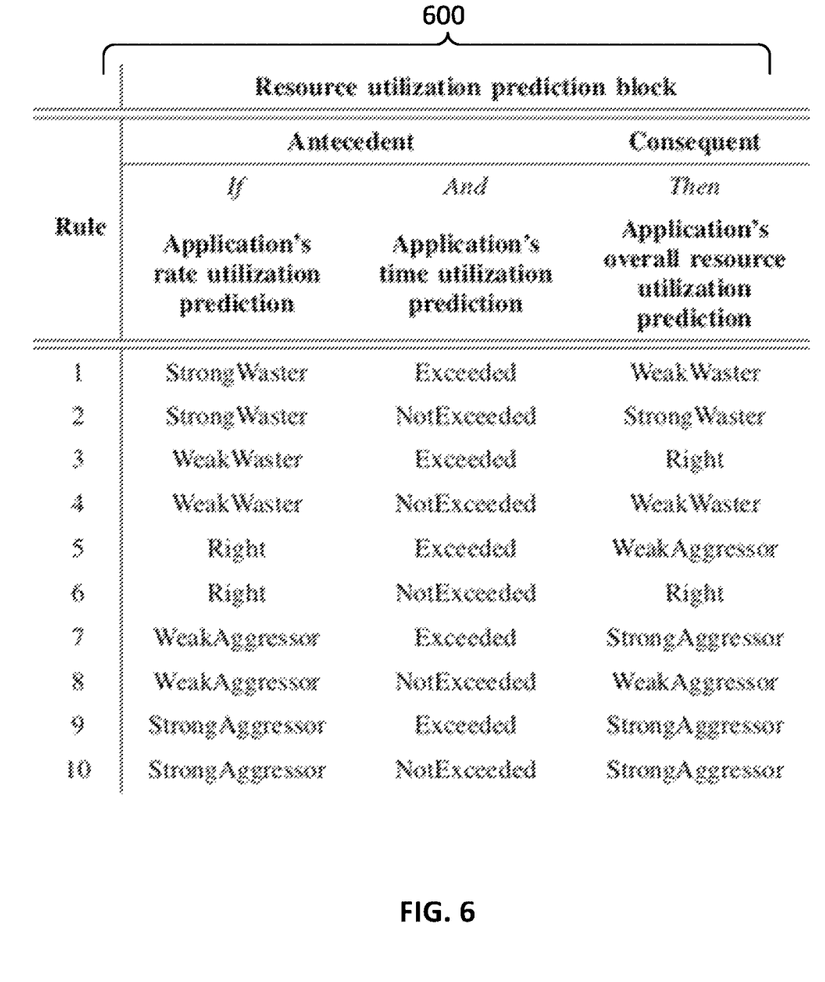
FIG. 6 shows an illustrative set of fuzzification rules that can be applied by a resource utilization prediction block of the fuzzy logic link decision system of FIG. 5.
Figure 7:
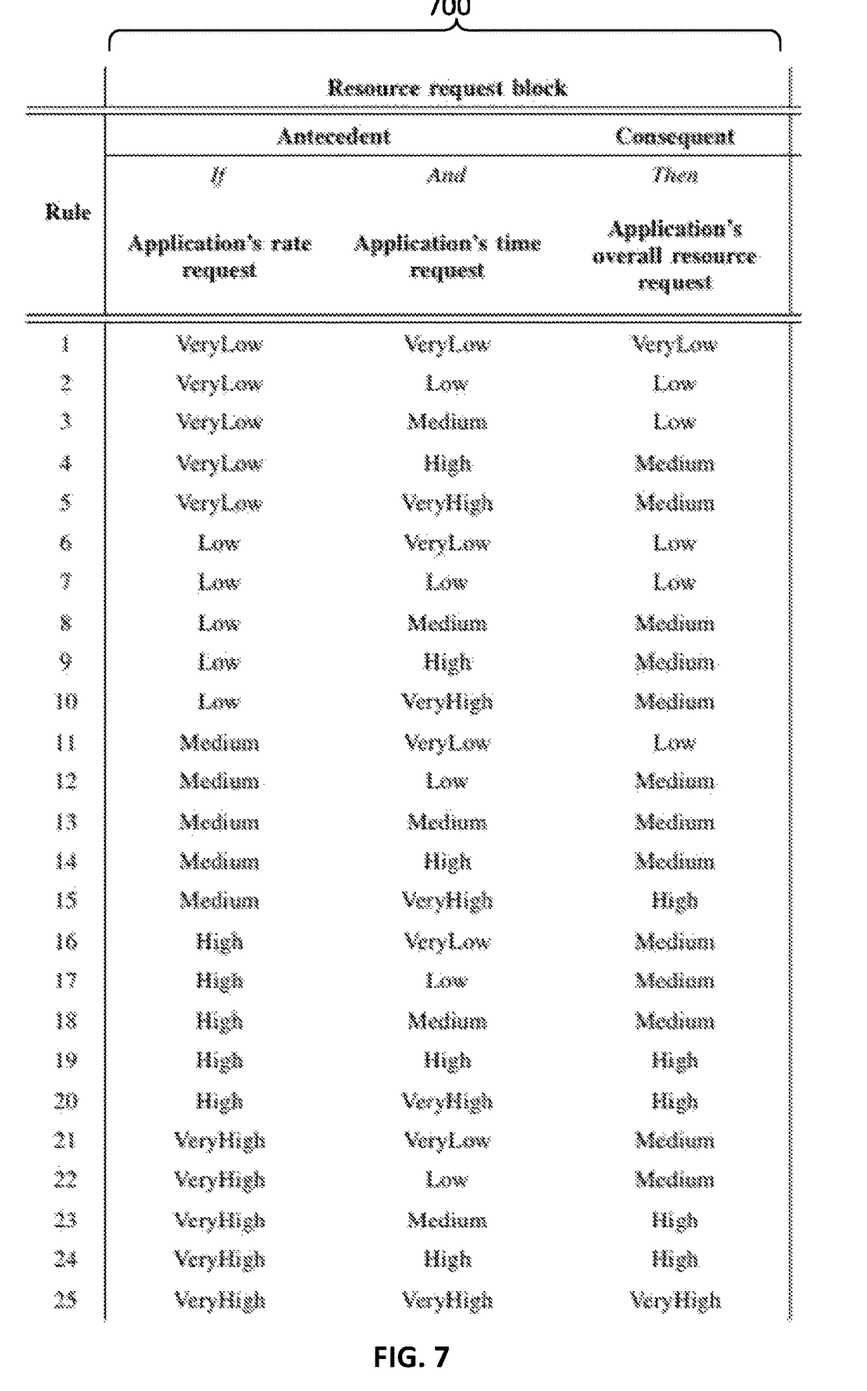
FIG. 7 shows an illustrative set of fuzzification rules that can be applied by a resource request block of the fuzzy logic link decision system of FIG. 5.
Figure 8:
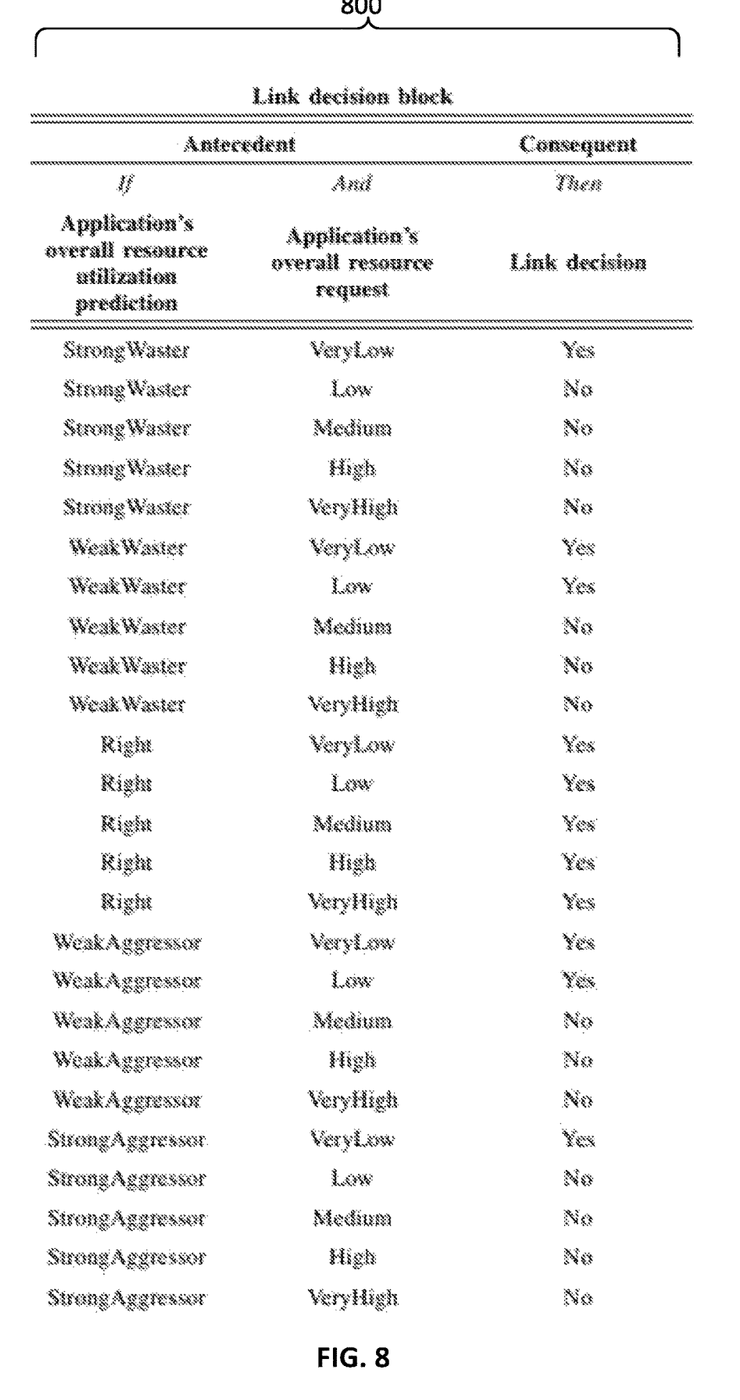
FIG. 8 shows an illustrative set 800 of fuzzification rules that can be applied by a link decision block of the fuzzy logic link decision system of FIG. 5.

By way of example, FIG. 6 shows an illustrative set 600 of fuzzification rules that can be applied by resource utilization prediction block 502, FIG. 7 shows an illustrative set 700 of fuzzification rules that can be applied by resource request block 504, and FIG. 8 shows an illustrative set 800 of fuzzification rules that can be applied by link decision block 506. As known in the art, in fuzzy logic systems, a fuzzification step helps determine to which extent each rule is relevant to the current situation (i.e., which rule is fired). Then, a fuzzy inference system combines all the possible states of the rule set and produces a fuzzy output.

In the illustrated example, link decision block 506 assigns one of two linguistic terms as the link decision, Yes and No, to indicate whether an application's request on the respective link is approved or not. A defuzzification step 508 can then be performed to produce a crisp output value. For example, a Center-of-Gravity (CoG) defuzzification method, as known in the art, can be used. In defuzzification step 508, the output crisp value is compared to a Decision Threshold T. If the output crisp value is higher than T, the respective link is approved for allocation to the requesting application.

Referring again to FIG. 4, the individual network link decisions are provided as inputs to the reinforcement learning path decision model 408 along with the available link resources, and application class information included in the resource assignment policy. The reinforcement learning path decision model 408 maps these inputs to a final decision for entire network link path defined by network link set $LS^p_t$. In an example embodiment, the path decision model 408 applies deep reinforcement learning using known deep reinforcement learning techniques that can take into account feedback from the DCN controller 206 regrading previous decisions. However, other machine learning models can be used in other embodiments. An aggregator 404 aggregates link decisions for a reward function 406 that is configured to motivate the path decision model 408 to approve queries about applications' requests coming from the DCN controller 106. Training can be influenced by application weights that are in included in the resource assignment policy that may urge greater tolerance for selfish behavior for certain types of applications.

As shown in FIG. 5, the resource assignment learning component bases its decision for an application' resource request upon the network state, expressed by the current links' utilization and the maximum available capacity on a given link, as well as, the application's state, expressed by the amount of resources it is asking for and its expected behavior with the assigned resources. The point is not to disturb the network operation by rejecting an application when it is not necessary. For instance, an application may be deemed a selfish application. However, since there may be an abundance of resources in the network, the network operation and the other existing applications will not be affected by that selfish application. In this situation, the resource assignment learning module will not reject the selfish application's request. Nevertheless, in other situations, the resource assignment learning module may decide to reject that same selfish application's request under different network state.

Thus, a DCN administrators may specify the class (i.e., type) of each application and the weight of each application in the reward function used by the learning system. This enables DCN administrators to bypass the process of approving or rejecting an application's request based on its behavior for some high priority applications. As noted above, the resource assignment learning component 204 provides two sets of outputs to the DCN controller 206, a detailed links decision and a path decision. The detailed links decision gives the decision (approval or rejection) for an application on a link by link basis. For a given application behavior, the amount of resources an application is asking for may be tolerated on a given link but denied on another one. Hence, the detailed links decision can provide useful information to the DCN controller 206. However, the final decision on whether to approve or reject an application's request is via the path decision. The detailed links decision can be particularly relevant to the DCN controller 206 if the overall path decision is to reject an application's request. The detailed links decision enables the DCN controller 206 to identify the problematic links and exclude them from further resource assignment decisions for a certain application. However, the detailed links decision can be ignored if the path decision is to approve an application's request.

Among other things, the present disclosure presents a resource usage efficiency evaluation module that can function with an existing DCN controller that is tasked with scheduling DCN resources, for example in a DC-NAI network. The disclosed evaluation module can aid a DCN controller in making resource (i.e., link, rate, and time) assignment decisions by taking into consideration the amount of resources requested by the requesting application, the application resource usage history, as well as the network state. In some scenarios, the disclosed systems and methods can encourage the applications hosted in DC-NAI networks to use their assigned resources efficiently in order to increase their resource utilization (i.e., minimize the amount of wasted resources), as well as encourage the applications not to go beyond the amount of allocated resources since their future requests may be rejected by the evaluation module. Furthermore, the disclosed systems and methods do not classify an application as trusted/untrusted or well-behaved/selfish a priori. Rather, the evaluation module relies on the application behavior in terms of its resource usage history as well as its amount of requested resources. Finally, by simultaneously considering the application's behavior and the network state, the evaluation module does not disturb the network operation by rejecting an application's request when it is not necessary.

Figure 9:
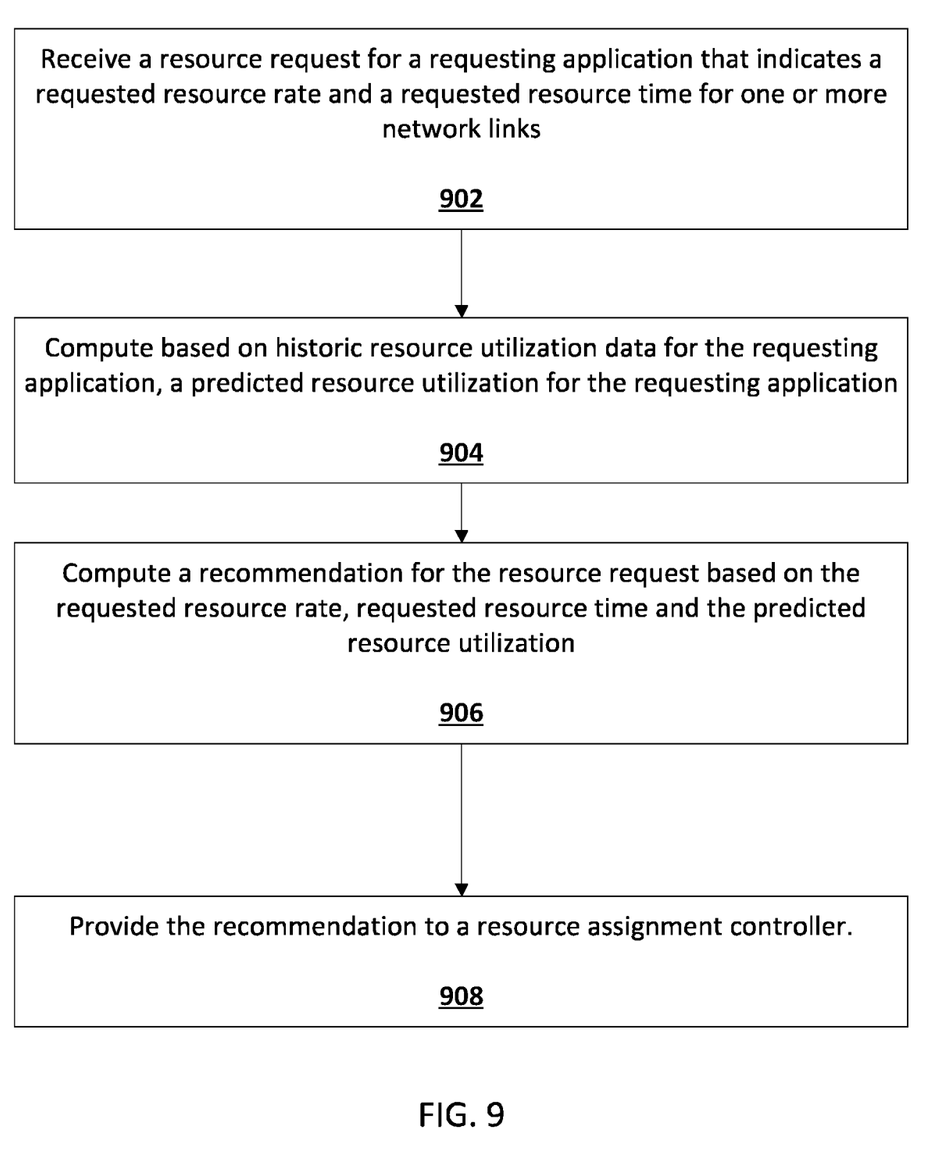
FIG. 9 is a flow chart of an example of a method performed by the evaluation module of FIG. 2.

FIG. 9 summarizes an example of a computer implemented method that can be performed by evaluation module 110 for generating a resource assignment recommendation for DCN 100. The method includes: receiving a resource request for a requesting application that indicates a requested resource rate and a requested resource time for one or more network links (902); computing, based on historic resource utilization data for the requesting application, a predicted resource utilization for the requesting application (904); computing a recommendation for the resource request based on the requested resource rate, requested resource time and the predicted resource utilization (906); and providing the recommendation to a resource assignment controller (e.g., DCN controller 103) (908).

Example Processing Unit

Figure 10:
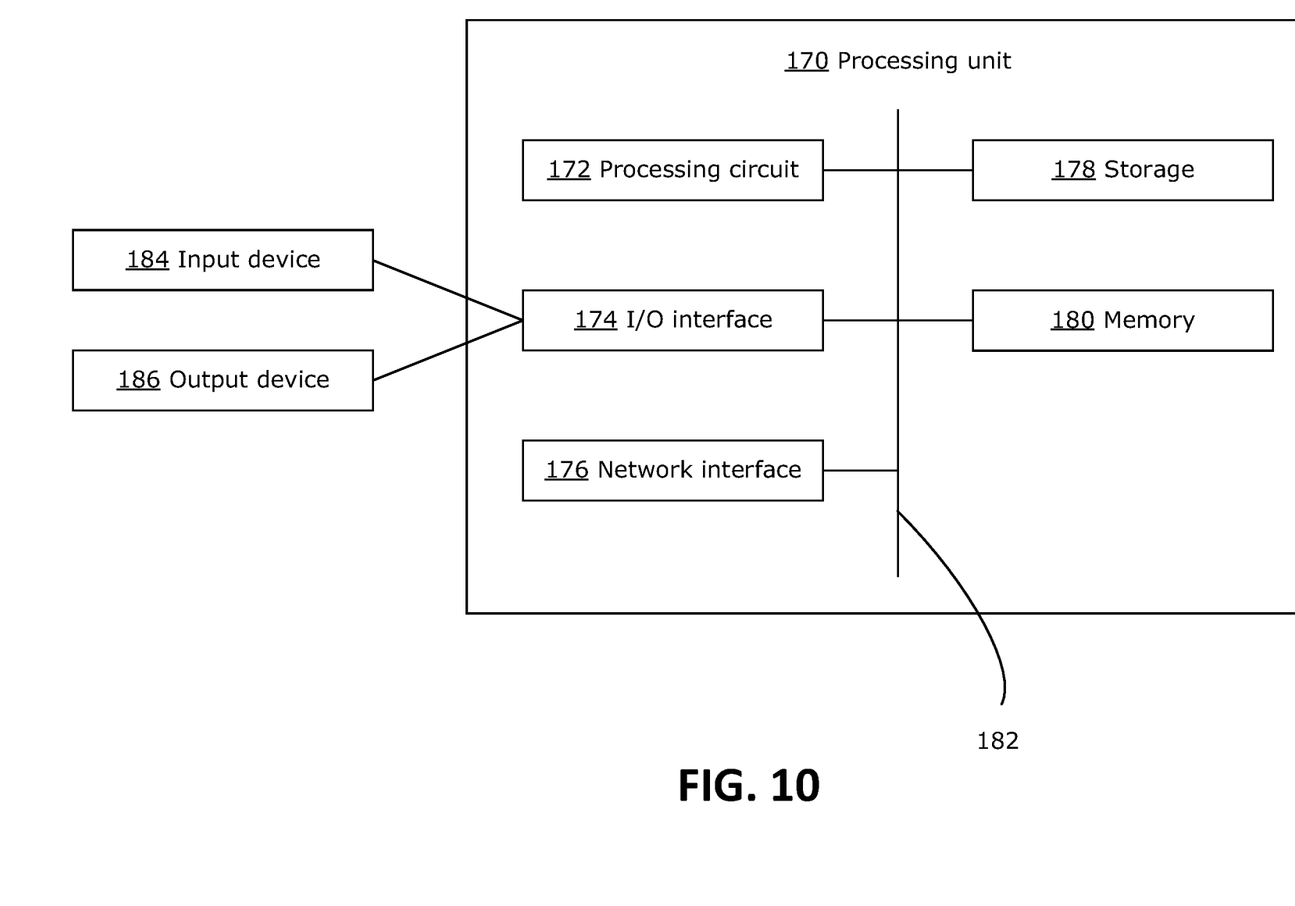
FIG. 10 is a block diagram of a processing unit that can be used to implement features of the system of FIG. 1 according to example embodiments.

FIG. 10 is a block diagram of an example processing unit 170, which may be used to implement evaluation module 110 or one or more of the modules, components, models or engines of the evaluation module 110. Processing unit 170 may be used in a computer device to execute machine executable instructions that implement one or more of or one or more of the modules, components, models or engines of the evaluation module 110. Other processing units suitable for implementing embodiments described in the present disclosure may be used, which may include parts different from those discussed below. Although the Figure shows a single instance of each part, there may be multiple instances of each part in the processing unit 170.

The processing unit 170 may include one or more hardware processing circuits 172, such as a processor, a microprocessor, a general processor unit (GPU), a hardware accelerator, an application-specific integrated circuit (ASIC), a field-programmable gate array (FPGA), a dedicated logic circuitry, or combinations thereof. The processing unit 170 may also include one or more input/output (I/O) interfaces 174, which may enable interfacing with one or more appropriate input devices 184 and/or output devices 186. The processing unit 170 may include one or more network interfaces 176 for wired or wireless communication with a network.

The processing unit 170 may also include one or more storage units 178, which may include a mass storage unit such as a solid state drive, a hard disk drive, a magnetic disk drive and/or an optical disk drive. The processing unit 170 may include one or more memories 180, which may include a volatile or non-volatile memory (e.g., a flash memory, a random access memory (RAM), and/or a read-only memory (ROM)). The memory(ies) 180 may store instructions for execution by the processing circuits(s) 172, such as to carry out examples described in the present disclosure. The memory(ies) 180 may include other software instructions, such as for implementing an operating system and other applications/functions.

There may be a bus 182 providing communication among parts of the processing unit 170, including the processing circuits(s) 172, I/O interface(s) 174, network interface(s) 176, storage unit(s) 178 and/or memory(ies) 180. The bus 182 may be any suitable bus architecture including, for example, a memory bus, a peripheral bus or a video bus.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various parts for performing at least some of the aspects and features of the described methods, be it by way of hardware parts, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/parts, the systems, devices and assemblies could be modified to include additional or fewer of such elements/parts. For example, although any of the elements/parts disclosed may be referenced as being singular, the embodiments disclosed herein could be modified to include a plurality of such elements/parts. The subject matter described herein intends to cover and embrace all suitable changes in technology.

All published documents identified in this disclosure are incorporated herein by reference.

The invention claimed is:

1. A computer implemented method for resource assignment recommendation for a data center network:
   receiving a resource request for a requesting application that indicates a requested resource rate and a requested resource time for one or more network links;
   computing, based on historic resource utilization data for the requesting application, a predicted resource utilization for the requesting application, wherein the historic resource utilization data for the requesting application comprises a sequence of actual resource rate utilizations and actual resource time utilizations corresponding to a sequence of historic resource requests by the requesting application, the sequence of actual resource rate utilizations indicating, for each of the actual resource rate utilizations in the sequence, a relative utilization of the resource rate compared to a requested resource rate indicated in the corresponding historic resource request, and the sequence of actual resource time utilizations indicating, for each of the actual resource time utilizations in the sequence, a relative utilization of the resource time compared to a requested resource time indicated in the corresponding historic resource request;
   computing a recommendation for the resource request based on the requested resource rate, requested resource time and the predicted resource utilization; and providing the recommendation to a resource assignment controller.

2. The method of claim 1 wherein the recommendation is one of a recommendation to accept the resource request and a recommendation to deny the resource request.

3. The method of claim 1 wherein the requested resource rate is a network bandwidth amount and the requested resource time is a time duration for which the network bandwidth amount is requested.

4. The method of claim 1 wherein the historic resource utilization data is retrieved from a tracking repository, the method further comprising:
receiving actual resource utilization data for the requesting application corresponding to a previous resource request by the requesting application, the actual resource utilization data indicating an actual resource rate utilization and an actual resource time utilization corresponding to the previous resource request; and
storing the actual resource utilization data for the requesting application at the tracking repository as part of the historic utilization data.

5. The method of claim 1 wherein the predicted resource utilization for the requesting application comprises a rate utilization behavior prediction and a time resource utilization behavior prediction.

6. The method of claim 5 wherein the predicted resource utilization is computed using a machine learning based time series prediction model that maps the sequence of actual resource time utilizations to: (i) one of a plurality of candidate rate resource behavior categories to generate the rate utilization behavior prediction, and (ii) one of a plurality of candidate time resource behavior categories to generate the time resource utilization behavior prediction.

7. The method of claim 6 wherein the machine learning based time series prediction model uses a long short-term memory (LSTM) network.

8. The method of claim 1, comprising:
computing, for at least one of the network links, a link resource utilization prediction based on capacity of the at least one network link and the requested resource rate and the requested resource time; and
determining, for the at least one network link, a link decision based on the link resource utilization prediction and the predicted resource utilization, the link decision indicating if the at least one network link should be used in fulfilling the resource request or should not be used in fulfilling the resource request;
wherein computing the recommendation for the resource request is based at least in part on the link decision.

9. The method of claim 8 wherein:
the predicted resource utilization for the requesting application comprises: (i) a rate utilization behavior prediction that indicates a rate utilization behavior category for the requesting application selected from a set of candidate rate utilization behavior categories, and (ii) a time resource utilization behavior prediction that indicates a time resource utilization behavior category for the requesting application selected from a set of candidate time resource utilization behavior categories;
computing the link resource utilization prediction comprises mapping the available capacity of the at least one network link, the requested resource rate and the requested resource time to one of a plurality of candidate link resource utilization prediction categories;
and fuzzy logic is used for determining the link decision.

10. The method of claim 8 wherein the one or more network links include a plurality of network links that collectively form a network path, and respective link resource utilization predictions are computed and respective link decisions are determined for each of the plurality of network links,
wherein computing the recommendation for the resource request comprises mapping, using a machine learning based model, to one of two candidate recommendation decisions for the network path, based on the respective link decisions for each of the plurality of network links and available resource data for each of the plurality of network links.

11. The method of claim 10 comprising training the machine learning based model to map to candidate recommendation decisions that discourage selfish resource requests by requesting applications.

12. The method of claim 10 wherein the mapping to one of two candidate recommendation decisions is also based on a priority classification for the requesting application.

13. The method of claim 10 wherein the machine learning based model comprises a deep reinforcement learning neural network model.

14. A system for resource assignment recommendation for a data center network, the system comprising one or more processing circuits and one or more non-transient memories storing software instructions that, when executed by the one or processing units, configure the system to:
receive a resource request for a requesting application that indicates a requested resource rate and a requested resource time for one or more network links;
compute, based on historic resource utilization data for the requesting application, a predicted resource utilization for the requesting application, wherein the historic resource utilization data for the requesting application comprises a sequence of actual resource rate utilizations and actual resource time utilizations corresponding to a sequence of historic resource requests by the requesting application, the sequence of actual resource rate utilizations indicating, for each of the actual resource rate utilizations in the sequence, a relative utilization of the resource rate compared to a requested resource rate indicated in the corresponding historic resource request, and the sequence of actual resource time utilizations indicating, for each of the actual resource time utilizations in the sequence, a relative utilization of the resource time compared to a requested resource time indicated in the corresponding historic resource request;
compute a recommendation for the resource request based on the requested resource rate, requested resource time and the predicted resource utilization; and
provide the recommendation to a resource assignment controller.

15. The system of claim 14 wherein the historic resource utilization data is retrieved from a tracking repository, the system being configured to:
receive actual resource utilization data for the requesting application corresponding to a previous resource request by the requesting application, the actual resource utilization data indicating an actual resource rate utilization and an actual resource time utilization corresponding to the previous resource request; and
store the actual resource utilization data for the requesting application at the tracking repository as part of the historic utilization data.

16. The system of claim 14 wherein the predicted resource utilization for the requesting application comprises a rate utilization behavior prediction and a time resource utilization behavior prediction; and the predicted resource utilization is computed using a machine learning based time series prediction model that maps the sequence of actual resource time utilizations to: (i) one of a plurality of candidate rate resource behavior categories to generate the rate utilization behavior prediction, and (ii) one of a plurality of candidate time resource behavior categories to generate the time resource utilization behavior prediction.

17. A computer readable memory product storing software instructions that, when executed by the one or processing units, configure the one or processing units to:

receive a resource request for a requesting application that indicates a requested resource rate and a requested resource time for one or more network links;

compute, based on historic resource utilization data for the requesting application, a predicted resource utilization for the requesting application, wherein the historic resource utilization data for the requesting application comprises a sequence of actual resource rate utilizations and actual resource time utilizations corresponding to a sequence of historic resource requests by the requesting application, the sequence of actual resource rate utilizations indicating, for each of the actual resource rate utilizations in the sequence, a relative utilization of the resource rate compared to a requested resource rate indicated in the corresponding historic resource request, and the sequence of actual resource time utilizations indicating, for each of the actual resource time utilizations in the sequence, a relative utilization of the resource time compared to a requested resource time indicated in the corresponding historic resource request;

compute a recommendation for the resource request based on the requested resource rate, requested resource time and the predicted resource utilization; and provide the recommendation to a resource assignment controller.

\* \* \* \* \*